March 15, 1966  F. JONKER ETAL  3,240,114
INFORMATION STORAGE AND RETRIEVAL COPY APPARATUS
Filed Nov. 17, 1961  6 Sheets-Sheet 1

INVENTORS:
William Parks III, William P.
Gingras, Frederick Jonker

BY Homer L. Montague
   atty.

March 15, 1966     F. JONKER ETAL     3,240,114
INFORMATION STORAGE AND RETRIEVAL COPY APPARATUS
Filed Nov. 17, 1961     6 Sheets-Sheet 2

INVENTORS:
William Parks,III, William P.
Gingras, Frederick Jonker
BY
Homer R. Montague
atty

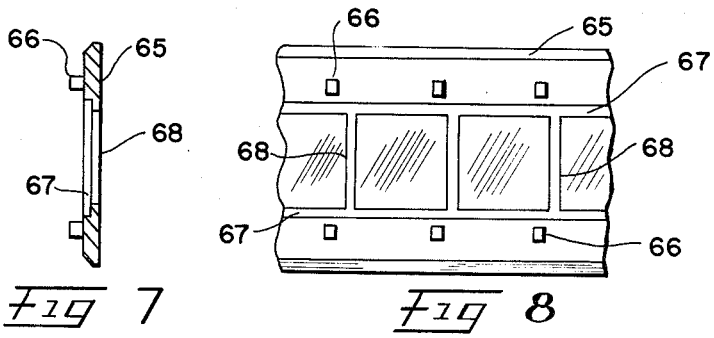
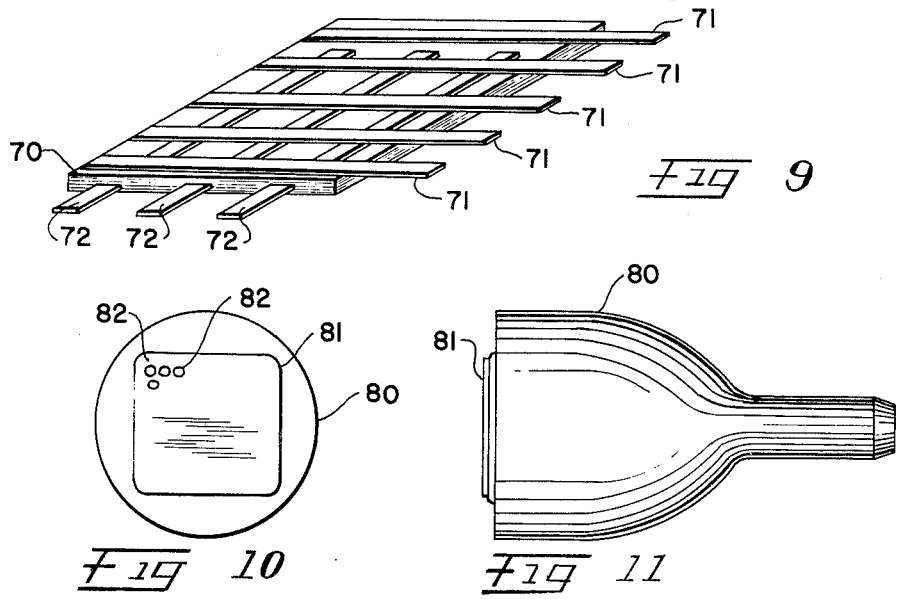
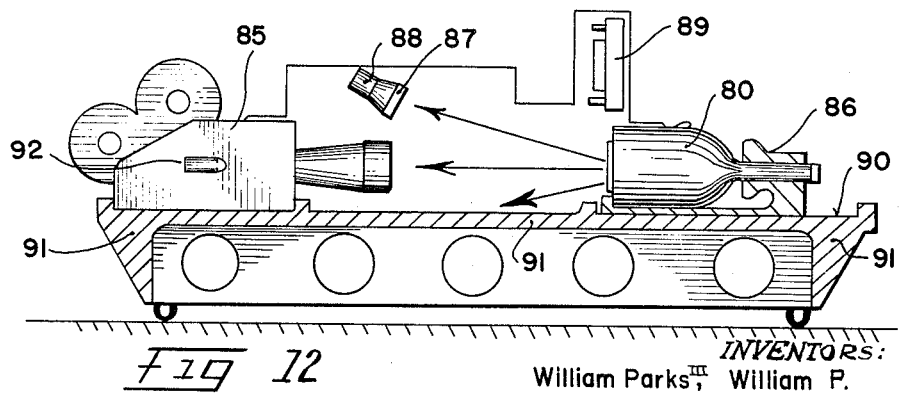
INVENTORS:
William Parks III, William P. Gingras, Frederick Jonker
BY Homer R. Montague
  atty.

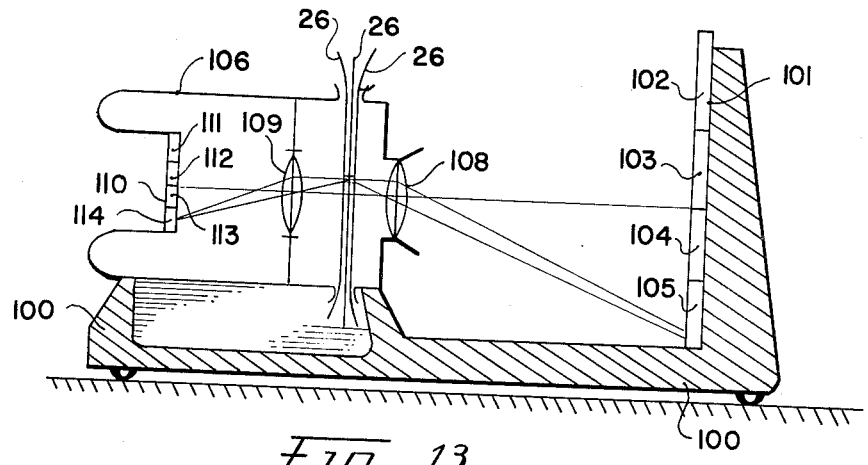
Fig. 13
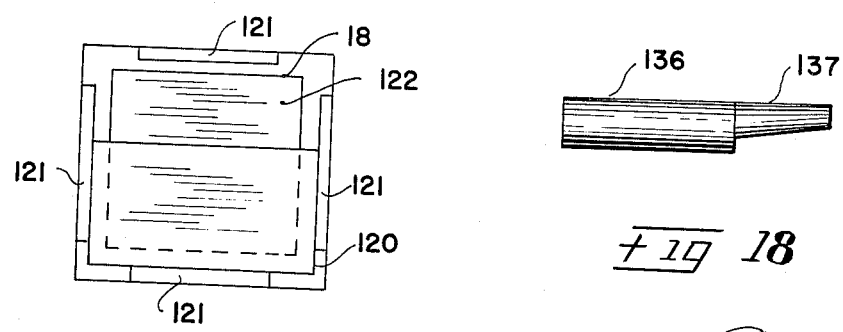
Fig. 14
Fig. 18
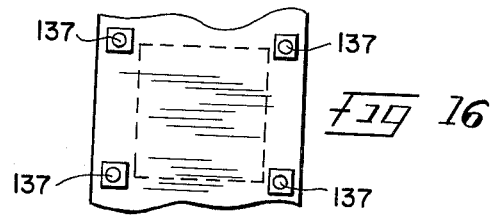
Fig. 16
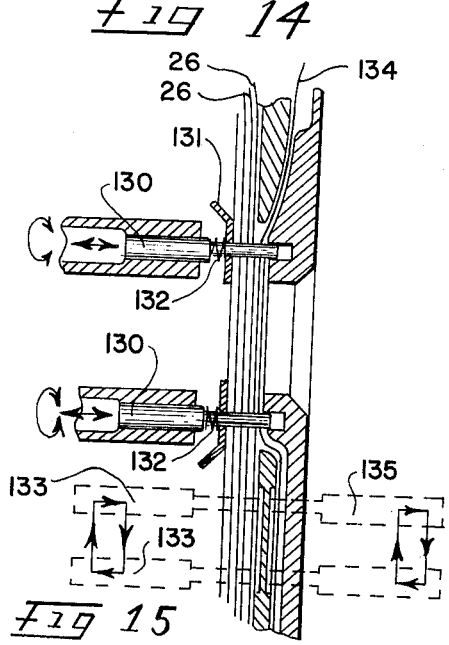
Fig. 15
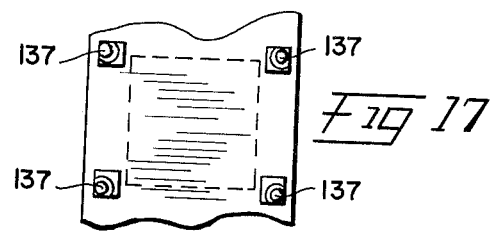
Fig. 17
INVENTORS:
William Parks III, William P. Gingras, Frederick Jonker
BY Homer R. Montague
atty.

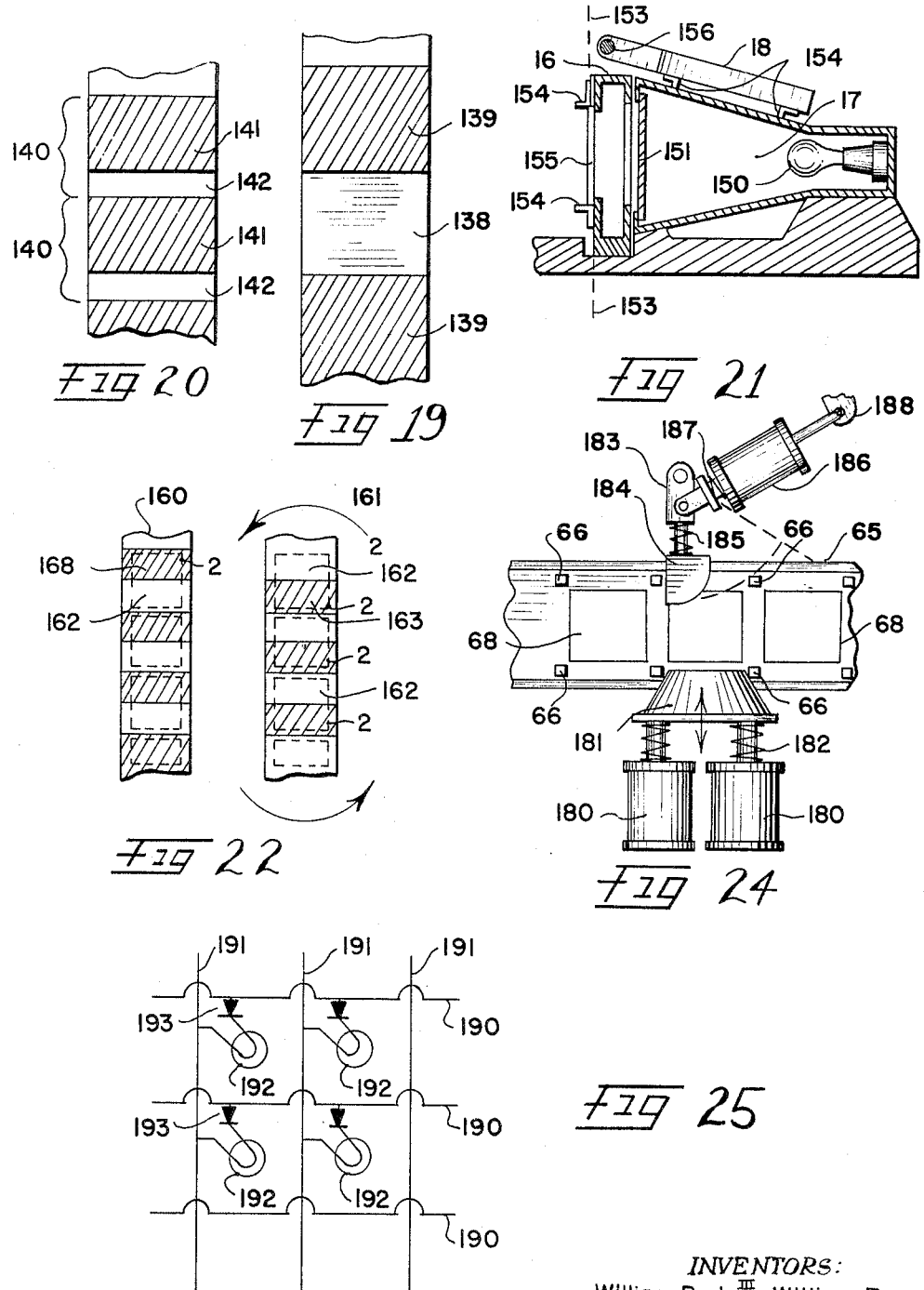

INVENTORS:
William Parks,III William P.
Gingras, Frederick Jonker
BY
Homer R. Montague
Atty.

United States Patent Office 3,240,114
Patented Mar. 15, 1966

3,240,114
INFORMATION STORAGE AND RETRIEVAL
COPY APPARATUS
Frederick Jonker, Washington, D.C., and William P.
Gingras, Rockville, and William L. Parks III, Silver
Spring, Md., assignors to Jonker Business Machines,
Inc., a corporation of Delaware
Filed Nov. 17, 1961, Ser. No. 153,181
11 Claims. (Cl. 88—24)

The present invention pertains to information retrieval systems of the general nature of superimposable card systems, or peekaboo systems, commercially also known as Termatrex systems.

It is contemplated that the present invention may serve for instance as an index to, for example, a file of documents, such as reports, books or cards. In such case, each of the documents is, according to the teachings of the present invention, assigned an accession number, and the documents are stored in sequence according to this number. When information on a given subject is desired, certain terms describing this subject may be entered into a machine which will then produce the accession numbers of all of those documents in the files which contain information on the desired subject.

In United States Patent No. 3,052,150, issued to F. Jonker on September 4, 1962, there are described machines of the same general nature as that which is contemplated by the present invention, the same using relatively large, thin, non-transparent flexible cards of metal, plastic, paper or other suitable material. In the machines described in the patent, a document having a certain accession number is entered on such a card by drilling a certain hole in a certain position which is dedicated to this accession number. Generally the location of the position dedicated to a certain document can be identified by means of an X–Y coordinate system. For example, the position dedicated to document 1225 can be found on each card by first moving 12 positions along the X-axis, followed by a move of 25 positions on the Y-axis. Each of the cards in the system has the same position dedicated to the same accession number.

It is also possible to have a combination of two or more positions dedicated to the same accession number and the invention likewise applies to such systems. However, generally only one position is assigned to each document and the invention will be described for that case.

In the event the documents are classified according to a classification system, each of the cards of the system may be assigned to one of the classes, subclasses or sub-subclasses of the classification system. If, instead of a classification having a certain hierarchy, the subjects of the documents are described by a number of descriptive terms without any form of hierarchical subordination, each of these descriptive terms is assigned a certain card. For example, if it is desired to obtain from a file of reports on aircraft instrumentation indexed with descriptive terms, all reports which are concerned with the "testing of supersonic airspeed indicators," the investigator would, in practicing this invention, select the cards assigned to the term Testing or Test; the card assigned to the term Supersonic; and the card assigned to the term Airspeed Indicator; or, if this latter term is broken up into two separate terms, the investigator would select the card assigned to the term Airspeed and the card assigned to the term Indicator. Classes, subclasses, phrases and one-word terms will be generally referred to hereinafter as "terms."

According to my co-pending application No. 579,110 all of the cards so selected are superimposed and placed in the machine and a hole is drilled in all of these cards simultaneously at the position corresponding to the serial number of the document that is to be entered.

Conversely, if a search is to be made, all cards corresponding to the search terms are placed in superimposition in the machine. A light source in the base of the machine then shows the coinciding holes in these cards. A co-ordinate system then allows the positions of these members to be read off.

Information retrieval systems based on said principles have definite limitations in size of the information collection that can be handled by such systems. The reasons are that there is a definite practical lower limit to the size of the holes one can use, and a definite practical upper limit to the size of the cards that can be used. Thus, the potential number of holes on these cards, which corresponds to the size of the collection that can be entered in this system, is definitely limited.

It is the object of the present invention to enlarge the capacity of such systems very considerably while yet allowing the use of cards of moderate and practical size.

Another object of the invention is to provide a search system, simple enough and low enough in cost to allow large-scale dissemination of the same.

This invention is an improvement upon F. Jonker co-pening patent applications: "Method, Apparatus and Records for Retrieval of Information," filed March 27, 1958, Serial #724,480, now abandoned, and "Method and Apparatus for Dissemination of Information Retrieval System and Enlargement of Capacity," filed September 10, 1959, Serial #839,242.

The above objectives are, according to the above inventions and to the present one, achieved by photographic miniaturization. However, the present invention offers the following additional advantages:

The installation can create the miniaturized termcards, further referred to as mini-term cards, by photographing full size Termatrex cards. It can also create this mini-term card by photographing a light display, of which the light pattern is programmed electronically from magnetic tape on other media.

The installation can also be used to search superimposed tapes of mini-term cards and scan the same electronically by means of a form of flying-spot scanner and enter the resulting data into other data processing equipment.

The installation can also be used as a copier to reproduce multiple sets of mini-term cards.

The installation can also be used as a linear microfilm file with recognition codes.

The installation can also be used as a substitute for conventional punched cards or magnetic tape as a storage medium of high density that can be rapidly searched.

The manner in which this will be accomplished will now be described with reference to the following figures:

FIGURE 1 shows an example of a full size term card.
FIGURE 2 shows an example of miniaturized term cards.
FIGURE 3 shows an overall perspective view of the overall installation.
FIGURE 4 shows an overall perspective view of a visual reader.
FIGURE 5 shows the installation with two different types of front lighting.
FIGURE 6 shows an assembly drawing of a viewer and FIGURES 7 and 8 show details of a filmholder.
FIGURE 9 shows a cross-section of an electroluminescent (E–L) matrix used in the invention.
FIGURES 10 and 11 show a C.R.T. that can be used as a substitute for the E–L matrix.
FIGURE 12 shows a complete installation using the C.R.T. tube.
FIGURE 13 shows an improved method of using the E–L matrix as a scanner.
FIGURE 14 shows how to use the installation for serial document storage.

FIGURE 15 shows the film transport mechanism and FIGURES 16, 17 and 18 show details of the same.

FIGURES 19 and 20 show special types of film for copying purposes.

FIGURE 21 shows a construction of the lightbox, cardholder and E–L matrix assembly.

FIGURE 22 shows a modification of FIGURES 19 and 20.

FIGURE 24 shows the film transport mechanism of the same.

FIGURE 25 shows a bloc diagram of a mechanical-electronic drive of the E–L matrix.

*Uses for conventional data processing*

Figure 1:
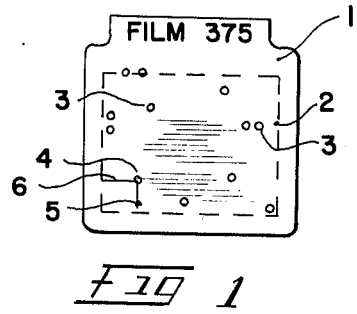

FIGURE 1 shows a full size term card dedicated to the term "air." In the commercially available Termatrex system, they are about 9″ x 10″ and made of opaque plastic. Numeral 2 designates the area within which the positions dedicated to documents are located, and numerals 3 designate holes. In the Termatrex system, a matrix of 100 x 100 is used. In this system, if coordinates 5 and 6 are respectively 40 and 25, hole 4 represents document #4025.

However, other forms of correspondence between position and document number are possible and it is also possible that each document has a combination of positions dedicated to it.

Figure 2:
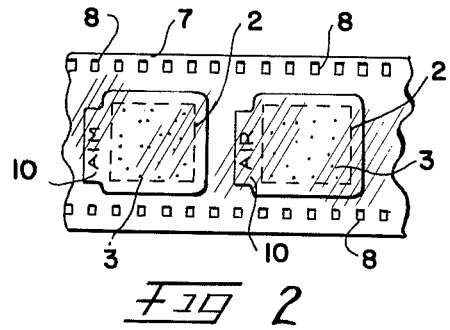

FIGURE 2 shows a mini-term card 7. It could, for example, be on 35 mm. film. Numerals 8 designate sprocket holes. Numerals 2 designate again the areas of FIGURE 1 within which the dots 3 are visible.

The term could be marked on the full-sized card 1, for example, with a teleprompter-typewriter in very large type so that the term will still be readable on the mini-term card.

Figure 3:
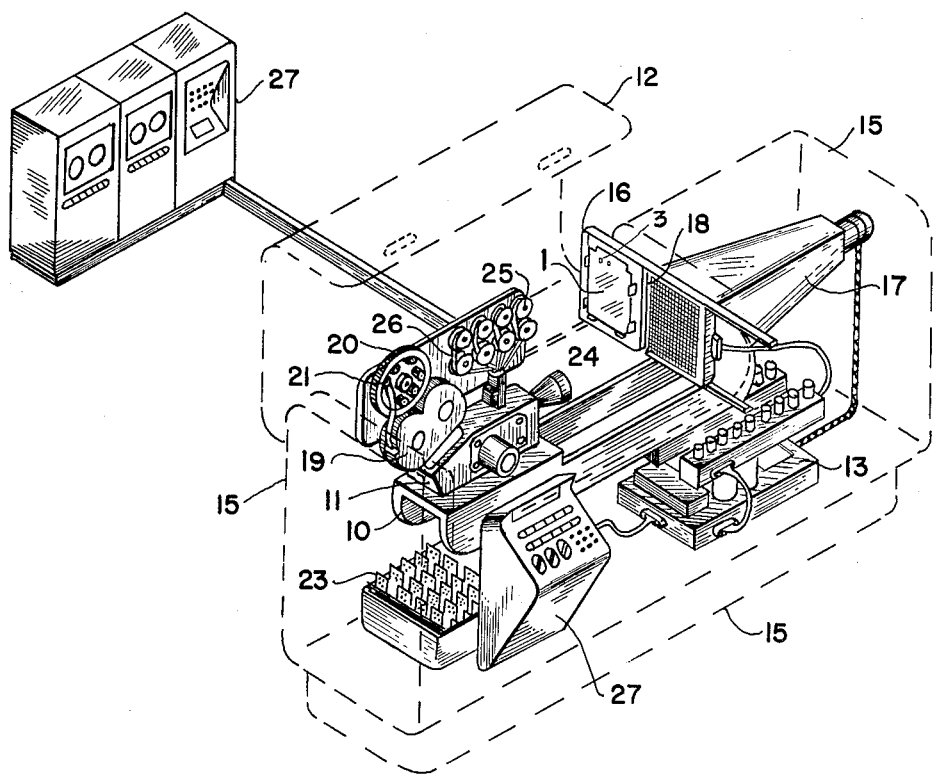

FIGURE 3 shows the overall installation according to the invention, comprising a frame 10, a camera assembly 11, an exposing unit comprising parts 16, 17 and 18, the driving electronics 13. The entire installation is surrounded by a light-tight cover 15 with a door 12.

The exposing assembly is made so that either the term card holder 16 can be placed before the camera assembly in which case a light in lightbox 17 is turned on to expose the holes 3 in cards 1 to the camera, or the lightmatrix 18 can be placed before the camera. This lightmatrix has as many positions that can be lighted as there are dedicated positions on the cards. Either the cardholder 16 or the lightmatrix 18 can be placed in front of the camera assembly 11. Details of this mechanism are shown in FIGURE 21 and will be discussed later.

The camera assembly is a modification of a motion picture camera adapted for single framing as well as for high speed operation at, for example, 100 frames per second. If, using the cardholder 16, the camera photographs each of the term cards of a complete set one by one, a negative is obtained which is developed in a conventional film developer. According to the invention, the camera is adapted for serving as a copier to make multiple positive copies from this one negative. This could be done, for example, by splicing the ends of the negative or masterfilm together so that it forms an endless loop. This loop is passed with the unexposed film through the camera, while the lightbox 17 is turned on with the card holder in front of it but without a card so that the lightbox serves as a lightsource to expose the film in the copying process.

In the copying process, the negative could be kept in a roll 20. It winds on it on the outside and is peeled out on the inside. The filmroll 20 is supported by a number of small rollers 21. The film onto which the mini-term cards are copied is contained within the two-pack film magazine 19.

According to the invention, it is also possible to enter data into the system without first drilling the data into Termatrex cards. This can be done by placing the lightmatrix 18 in front of the camera. The data can be read from punched card or paper or magnetic tape. Numeral 27 designates a magnetic tape and memory unit. An electronic control component 23 then lights the corresponding spots on the light matrix. The camera can then take a picture of the lightmatrix.

According to the invention, this installation can also be modified to be used as a search device. The camera assembly therefore features a mechanism that can feed a number of superimposed term tapes 26 into the camera. It comprises a number of rollers and reels 25 and a guide piece 24. The camera can move these in superimposition at a rate of at least 10–20 frames per second.

The scanning is performed frame by frame by means of the lightmatrix 18 and a photocell behind the superimposed films, inside the camera assembly 11. If the camera assembly is holding a particular frame of a number of superimposed strips stationary, the drive electronics 13 lights alternately each of the lights of the matrix. Whenever there is a coinciding hole in the film at the position on the film corresponding to the lighted spot on the matrix, this light will travel through the coinciding transparent spots. The photocell will then receive an impulse. The electronic drive mechanism that drives the lightspot, contains the information regarding the coordinates of the position of this spot. This is then transferred to a memory outside of the system. It could first go to a buffer memory and from there to magnetic tape, paper tape or punched cards.

If it is required that a search be performed for every document that has term B, C, and Q, but not term F, then the device first makes a copy of term F, which will be a negative. That negative is then scanned in superimposition with the positions of terms B, C, and Q.

In the device as shown in FIGURE 3, no more than 4 terms can be superimposed. However, if a search for six terms has to be made, 3 terms at a time could be superimposed with an unexposed film. Then the two exposed negative films are developed and positives are made which are scanned in superimposition.

Also, if a permanent photographic record of a search is needed, an unexposed film can be run in superimposition with a number of termstrips. This film can then be viewed visually by means of the reader shown in FIGURE 4.

Figure 5:
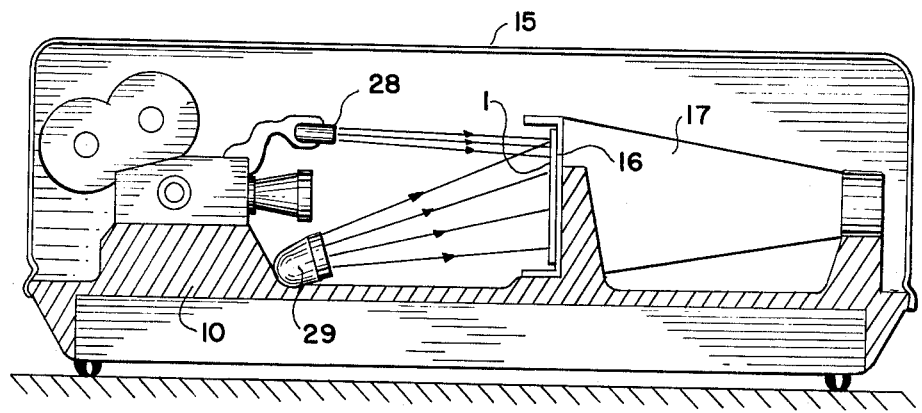

In order to identify filmstrips, the term or the serial number of the term or both will have to be shown in readable size. For that purpose, the card has the term and number printed in large size on it. FIGURE 5 shows how, by means of a spotlight 28, having condenser lenses and thus giving substantially parallel light, this section can be illuminated. It can thus be photographed in a separate film frame, which will become the leader frame to each term strip.

*Visual reader*

Figure 6:
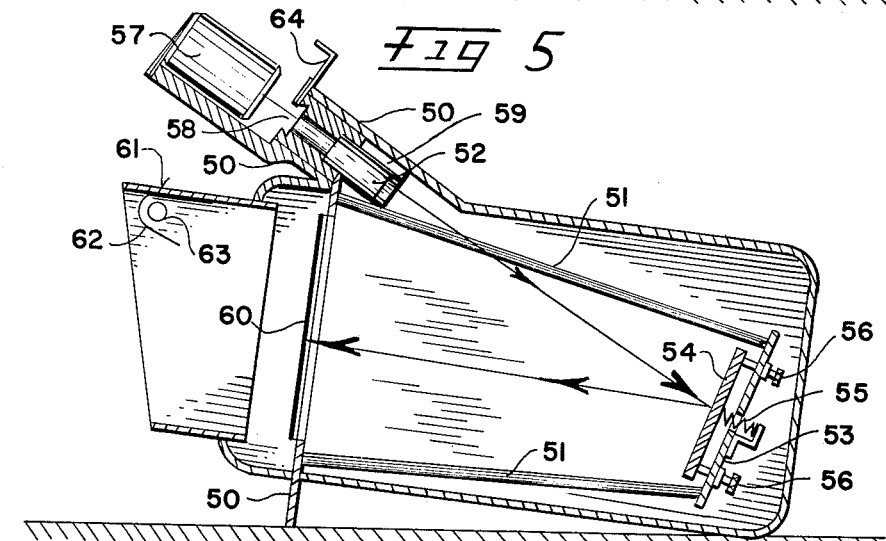

According to the invention, the device of FIGURE 3 can be used to search millions of items at very high speed. However, in many cases, an inexpensive device to search 10,000 to 50,000 documents visually is required. Such a reader shown in FIGURES 6, 7 and 8 could, for example, be used if an index was disseminated to hundreds or thousands of users.

The reader comprises a front plate 50 on which other components are mounted. Numeral 58 designates a dovetailed slot in which the film-holder can slide. Also mounted on this front plate 50 is the lightsource 57 which preferably provides parallel light and the lens system 52. Because the total depth of the lightpath through the coinciding holes is several times the diameter of the holes, telecentric lenses will have to be added to the lens system.

Mounted on a number of rods 51 is a plate, 53, against which mirror 54 rests, pulled tight against three adjustment screws 56 by a spring 55. Numeral 60 designates the back-lighted screen and 61 a hood.

On the screen 60 is a pattern of lines and holes which will allow the coordinates of the light dots appearing on the screen to be read off. To make this pattern better visible it can be made of an ink that will emit visible light under excitation by black light. If this ink is transparent, the reader can also be used as a document reader, when the blacklight is turned off.

FIGURES 7 and 8 show the filmholder 65 with pins 66 for the sprocket holes of the film. The windows 68 correspond to the active areas of the mini-term cards. Slot 67 has a glass plate fitted in it. After the film is inserted, a glass plate is placed on top of it. The film holder can slide back and forth in slot 58. A positioner 64 (FIG. 6) can be slid down, to fit in between two pins 66 to position the film holder accurately.

*Modifications of scanning system*

Shown in FIGURE 9 is a section of the electroluminescent matrix 18 having two sets of conductors 71 and 72 at either side. Whenever a potential is applied to a wire 71 and a wire 72, the intersection will light up. Devices of this nature are well known in the art. The electroluminescent matrix will further be referred to as an E-L matrix.

Instead of utilizing an E-L matrix with a crossed pattern of wires as shown in FIGURE 3 and 9, it is also possible to use a pattern of lightbulbs. These could be incandescent bulbs or neon bulbs. The advantages of these devices and the E-L matrix are that the light can be turned on at any one spot and kept on indefinitely. This makes it possible to enter data spot by spot at any speed they might be coming in. When used as a scanner, the scanning action can be stopped at any answer until the observed answer has been printed out.

It is also possible to use a cathode ray tube, preferably one based on the so-called photoforming technique, which will allow the beam to be stopped at one position. It utilizes, for example, a mask having holes, according to the basic pattern of dedication, in the case of Termatrex equipment, 10,000 holes in a pattern of 100 x 100.

FIGURES 10 and 11 show the face and side view of this tube 80, having a flat square section 81 with a mask having holes 82.

FIGURE 12 shows such a tube 80 in use as a scanner. This comprises a lens system 87 collecting light from the face of the tube 80 for photocell 88, acting as a servo to the beam. The flying spot is positioned at a spot through interaction of a deflection voltage which tries to move it on and the photocell, which, when it stops to receive light, triggers a reversal of the deflection voltage. Thus the spot is stabilized in the X direction of the sweep. For stabilization in the Y direction of the sweep, where the beam only moves once against 100 movements in the X direction, the same type of stabilizing circuit is used. However, a dampening factor is used which makes the reaction time of the servo action many times as slow (for example, 10 times) as the reaction time for stabilization of the spot in the X direction. This is achieved by having the reversal circuit servo by the average photocell output over a certain period, rather than the instantaneous output. The beam is moved to the next spot by allowing the deflector voltage to rise and turning on the reversal circuit until the photocell has been re-energized.

Other forms of C.R.T. scanners in which the beam can be stopped to hold for a definite period at any of the dedicated positions, are also possible and known in the art.

When the installation utilizes a C.R.T. tube for scanning or data input as well as data input by photographing Termatrex cards as shown in FIG. 12, it is necessary to move the face of the C.R.T. tube away from the image plane to make room for the light box and card holder 89. For this purpose, the C.R.T. can be placed on a sled 86 sliding in a bed 90 on the frame 91. The light box card holder assembly 89 can be lowered when the C.R.T. has been moved back.

The advantages of the E-L matrix or the lightbulb matrix are that they are simple and reliable. The E-L matrix, however, is slow as a scanner, about ½-⅓ second for 10,000 holes. The C.R.T. scanner, on the other hand, has comparatively speaking, unlimited speed.

For data input, speed is not so important, but for scanning, it is highly important. It is, therefore, part of the invention, that when the E-L matrix is used as a scanner, it will be scanning a multiple of scanning signals simultaneously, each signal having its own photocell.

This arrangement is schematically shown in FIG. 13 where an E-L matrix 101 and a film transport assembly 106 are mounted on a frame 100. The E-L matrix is divided into, for example, four parts 102, 103, 104 and 105, each having their own independent scanning signals. The lens 108 focuses lightspots coming from the E-L matrix 101 on the superimposed filmstrips 26. If there is a coincidence of transparent spots on the position of the film corresponding to the lighted spot on the E-L matrix, the lens 109 will focus the light coming through these films on a photocell assembly 110, comprising four separate photocells 111, 112, 113 and 114, placed in such a manner that any light coming from section 105 of the E-L matrix will always focus on the section 114 of the photocell assembly, etc. Thus, each section of the E-L matrix and the corresponding photocell section can operate independently and simultaneously as separate flying spot scanners.

Another advantage of the E-L matrix over the C.R.T. tube is that when the unit is used for input directly from the E-L matrix as well as to photograph Termatrex cards, all points of the E-L matrix can be lighted simultaneously so that it can serve as a lightsource for photographing the cards. However, when the installation is used as a duplicator, operation at the highest possible speed is desirable and the separate light box of much higher light intensity will be used.

Normally, the E-L matrix could scan at a speed of ½-1 second for 10,000 positions. If a 100-fold scanning signal is used, scanning speeds of 100 frames a second are possible, which is about the highest speed at which the film transport can operate.

*Use for conventional microfilm purposes*

It is also possible to use the installation for a conventional document-by-document linear microfilm file. The document can be photographed by placing it in the card holder and adding front lighting. The E-L matrix can provide the selection code. This device will require the term card holder or document holder to be placed on the E-L matrix. The document and the selection code could be placed on different frames. It is possible to place the document 120 in the cardholder and leave the E-L matrix partially uncovered. FIGURE 14 shows the face of the E-L matrix 18 and the document 120 held between the alignment blocs 121 of the cardholder. The area 122 of the E-L matrix remains uncovered. The front lighting will be parallel light directed only at the document area, as shown in FIGURE 5 where 29 designates a lightsource for this purpose. It is best to have two separate exposures, a short one for the document, and a longer one for the section 122 of the E-L matrix.

In searching the collection of documents, the Minimatrex installation is also used scanning the recognition code by means of the E-L matrix used as a flying spot scanner. To make a print of a selected document, the film transport mechanism comprises two independent transport mechanisms, one for the film having the information and the other for unexposed film. Both films are superimposed. Whenever a desired document is found, the unexposed film is advanced one frame and exposed. Then it is advanced again until another print is desired.

Then it is advanced again so that an unexposed frame can be exposed with the other desired document, etc.

Unexposed film is generally of sufficient transparency to allow this sort of scanning. However, it is better to use a film as shown in FIGURES 19 or 20, having alternating a clear frame for area for scanning and an area coated with photosensitive gelatin for copying. The film transport mechanism is shown in FIGURE 15 and will be described in detail later.

*Film transport mechanism and other mechanical details*

FIGURE 15 shows a film transport for moving superimposed films 26. For viewing, they are pinned together by alignment pins 130 which can be moved in through the sprocket holes and be retracted. A pressure plate 131 clamps the films together under pressure of springs 132.

The movement of the alignment pins 130, is mechanically coupled to the movement of the transport pins 133. After viewing, or exposing, the pins 130 are withdrawn and held in this position until pins 133 have performed their transport cycle. It comprises of moving in through sprocket holes, a movement in the transport direction over the distance of one frame. After this, the alignment pins 130 move and the transportation pins 133 are withdrawn, and moved back to their original position.

Added to this can be a separate transport mechanism for an unexposed film 134. The unexposed film enters the same alignment pins 130 but there is an independent transport mechanism 135, similar to the transport mechanism of the superimposed termstrips.

For better alignment action, it is possible to give the pins 130 the shape shown in FIGURES 17 and 18, namely a cylindrical section 136 and a tapered section 137, slightly eccentric in relation to section 136. When these pins move into the sprocket holes, there will be plenty of clearance, as shown in FIGURE 15. However, by turning pins 130, the sections 137 are pushed in the corner of the sprocket hole to force correct alignment. Before withdrawal of pins 130, they are first turned back again.

FIGURE 19 shows the sort of film that should preferably be used for printing purposes. It features clear sections 138 to be in front of the aperture during the scanning period and frames 139, having gelatin for copying.

FIGURE 20 shows a film where, for each frame 140, the area corresponding to a microfilmed document 141 is covered with gelatin and the area used for scanning of the recognition code 142 is clear.

FIGURE 21 shows a preferred way of combining the light box and the E–L matrix. The light box 17 has a lightsource 150 and a diffusion plate 151. Line 153 represents the image plane.

For photographing cards or for use as a duplicator, the card holder 16 is placed in front of light box. It features alignment blocs 154 to align the cards and a clear transparent support plate 155.

If the E–L matrix is used, the card holder is removed and the E–L matrix 18 is pivoted around bar 156, in position in front of the light box. It also features brackets 154 for holding term cards or documents.

*Uses as universal data processor*

I

The uses so far described pertain to its use for inverted search methods, that is, searching based on superimposition of term records. These uses included:

*Model A.*—Data input by photographing term cards. The camera assembly can transport two filmstrips in superimposition. Thus it can be used for the generation of multiple positives from the negative. This model uses only a light box.

*Model B.*—Data input by photographing term cards as well as by photographing the E–L matrix. It also acts as duplicator. This model has the E–L matrix as well as the light box. The E–L matrix can be used for electronic entry as well as to photograph term cards. However, the light box is needed as a lightsource for the duplicator.

*Model C.*—Has the same capabilities as Model B but the camera can transport up to 6 filmstrips in superimposition. It has the lightbox as well as the E–L matrix. The E–L matrix can then act as a scanner. Preferably, the modification with the multiple scanning signal will be used, or the C.R.T. matrix will be used. Model B can also provide a search record by running an unexposed film on top of the superimposed termstrips with the light on.

II

There are also many uses for conventional item-by-item data processing.

*Model D.*—Has the same capabilities as Model B and can be used as a sequential microfilm file with a binary selection code. It features an independent film transport for unexposed film by means of which prints can be made of the desired document. This feature could, of course, also be added to Model C.

*Model E.*—Is essentially similar to Model D but an electronic programming device and memory devices, buffers, arithmetic units, printers and other computer elements are attached to it.

This last model can receive item-by-item information such as accounting data. Depending on the way the light matrix is programmed, the storage matrix can be used as a simulation of a one-channel tape or a 100 channel tape.

The scanner can scan the tape for certain data and read them out into a computer.

The advantages over magnetic tape are:

(1) Data need not be entered and read out "on-the-fly" as on magnetic tape. Entry and readout does not require buffer storage and can be on a real time basis or as slow or as fast as required.

(2) Scanning rates of 100 x 100 bits=1,000,000 bits per second are possible.

(3) Density of storage is a minimum of 10,000 for 36 mm. or 7500 bits per linear inch, higher density is possible.

(4) Data need not be read out into a computer or another tape unit but can be transferred to unexposed film in the same unit. Here film according to FIGURES 19 or 20 should be used. Details are discussed below.

(5) The leader of each tape or each frame of transferred data can have identifying words printed on it in readable size. These can be printed on it by exposing a light pattern on the E–L matrix.

FIGURE 22 shows an example of the film that could be used. 160 is the data strip and 161 the transfer strip. Half the area of each frame is coated. The same film can be used as data strip and as transfer strip. This is done by turning it around as shown by the arrows.

In use, the top part of each matrix is scanned. If data are encountered that should be transferred, the beam exposes corresponding spots in the lower matrix.

*Semi-automatic reader*

Above various modifications of an installation of FIGURE 3 have been discussed for data input purposes as well as scanning.

Figure 4:
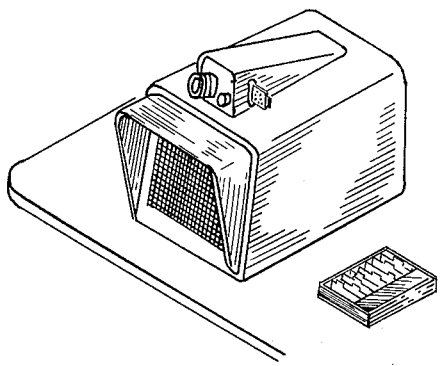

Also the visual reader of FIGURE 4 has been discussed. We will now discuss a modification of this reader where an E–L matrix scanner and an automatic advance mechanism for the filmstrip holder are added.

The drivemechanism of the E–L matrix need not be fully electronic since scanning speeds of 1–1½ seconds for the 10,000 position matrix are fast enough. A preferred embodiment therefore utilizes two stepping switches of 10 positions each supplemented by a 10-position beam switching tube. One pair forms the X axis drive; the other pair, the Y axis drive. The beam switching tubes make their scan while the corresponding stepping switch is stationary. Thus the stepping switches divided the matrix into 100-sub-matrices which are scanned by the beam switching tubes.

Figure 23:
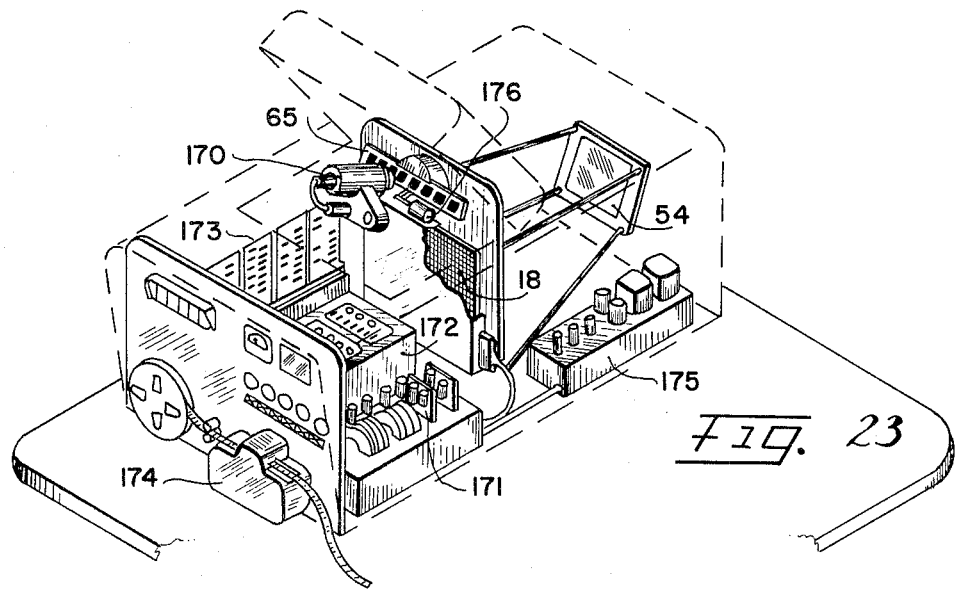
FIGURE 23 shows a semi-automatic viewer.

FIGURE 23 shows this device. It is similar to the device of FIGURE 6, except that the light source 57 in FIGURE 6 has been replaced by the photomultiplier 170 and the screen 60 in FIGURE 6 has been replaced by the E-L matrix 18. Further, the scan drive 171 has been added, a digit translator 172 and a digit distributor 173, a power supply 175, a paper tape punch 174 and a frame advance mechanism 176.

FIGURE 24 shows an example of a frame transport mechanism. Normally the filmholder 65 is held in accurate alignment for viewing by means of alignment part 181, wedged against the alignment pins 66. Part 181 is moved back and forth by means of a pair of solenoids 180 operating against springs 182.

The movement of the film holder takes place while alignment part 181 is retracted. The advance is performed by arm 183 pushing against one of the alignment pins 66. It is moved back and forth by a solenoid 186 cooperating with a return spring 187. In order to allow arm 183 on the return stroke to clear the next alignment pin 66, it carries a top part 184 having a sloping edge which is held at maximum diameter by spring 185. During the return stroke, this part is pushed back against the pressure of spring 185 by a pin 66, toward the pivot point of arm 183.

*Details of circuitry*

FIGURE 25 shows how, instead of the E-L matrix, a pattern of lightbulbs 192 can be used. These bulbs 192, each in series with a diode 193, are interposed between two intersecting sets of conductors 190 and 191. Circuits of this nature are well known in the art. If a conductor 190 and a conductor 191 are connected to the positive and negative side respectively of a source of electric power, the lightbulb at the intersection of these two particular conductors lights up.

Figure 26:
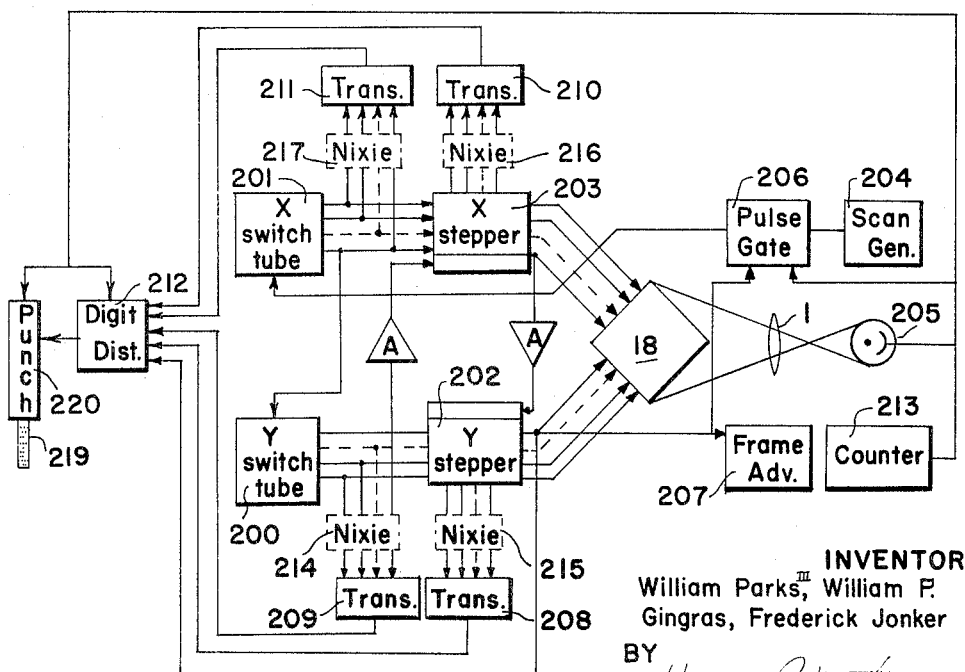
FIGURE 26 shows a light matrix that can be used instead of the E–L matrix.

FIGURE 26 shows a bloc diagram of a preferred way of switching this scanning signal for the E-L matrix 18 or the lightbulb matrix. The matrix taken as an example has 100 x 100 positions. The lightspot is commutating throughout the entire matrix 18 by means of two electronic beam switching tubes 200 and 201 working in conjunction with two 10-pole, 10-position electrical stepper switches 202 and 203. A minor scan of a small 10-line by 10-line area is generated by the X and Y beam switching tubes 200 and 201. The scan pulse generator 204 of 10 kc. feeds the X beam switching tube 202 containing 10 output targets. Each target is gated to energize one of ten conductors of the E-L matrix 18. This causes each target in turn to be energized, which sequentially energizes each of ten E-L matrix conductors. When No. 9 target of the X beam switching tube 200 is energized, the Y beam switching tube 201 is pulsed or caused to move one target, applying voltage to the next horizontal line. The ten targets of the X beam switching tube are against sequenced and the process is repeated. Thus, the two beam switching tubes will generate a minor scan of this ten by ten conductor area in 1/100 of a second.

The two stepper switches 202 and 203 form a major scan. The X stepper switch 203 in number one position connects the ten targets of the X beam switching tube to conductors 0 through 9 of the E-L matrix 18. When stepped to number 2 position, by the Y beam switching tube 200 at the completion of a minor scan, the X stepper switch 203 connects the ten targets of the X beam switching tube 201 to conductors 10 through 19 of the E-L matrix, etc. When the X stepper switch 203 arrives at number 10 position, the stepper switch moves the 10 targets of the Y beam switching tube 200 from conductors 0 through 9 to conductors 10 through 19 on the E-L matrix, etc. The major scan continues in this manner until all 100 major areas have been sequenced. Since each major area was completely swept by the minor scan, all 10,000 hole stations emanated a light spot, one at a time, which is the required effect. A 10,000 hole scan, using this minor-major scan technique, consumes approximately 1.6 seconds.

As the light spot sequentially moves over the matrix 18, coincident holes in the superimposed term cards admit light to the photocell 205. This feeds a stop command to the pulse gate 206. The light spot ceases to move and remains at this coincident hole for a period of time. The interval delay is set by the pulse gate. This will permit address display or print out. When this time interval is finished, the stop command ceases, the scan pulses start again and the X and Y beam switching tubes 200 and 201 and stepper switches 202 and 203 continue to the next coincident hole where the cycle is repeated. In the case of Minimatrex film where adjacent frames are to be scanned, the Y stepper switch, upon its cycle completion, feeds a frame advance device 207 which moves the next frame into view for repeat of the scan.

When the phototube 205 senses a light spot and the scan is momentarily stopped, the X and Y address of that particular coincident hole must be determined. Translators convert this address into proper form for entry into a paper tape punch. 208 and 209 designate the translators for the first and second Y digits. 210 and 211 designate the translators for the first and second X digits. One method of address readout is to sense the position of the energized targets in the beam switching tubes and the position of the stepper switches. These provide four 10-position outputs which exactly correspond to the four decimal digits associated with manual address readout in present Termatrex systems. Since paper tape requires binary information input, four decimal to binary digit translators are required. These are simple diode translators which accept 10-unit code input and provide 4-unit binary code output. The first Y digit translator senses Y stepper switch position. The second Y digit translator senses Y beam switching tube position, etc.

One method of address punching on paper tape uses space dedication as follows: Five-channel-wide paper tape is used, 4 channels for binary digit information and 1 channel for signalling the beginning of each new hole address. The first Y digit is punched in binary form at the first station of the paper tape. The second Y digit is likewise punched at the second station of the paper tape. The process is repeated until all four digits have been punched. Since only one station can be punched at a time, a digit distributor 212 is required which links the paper tape punch 220 and the four digit translators plus the frame digit. The digit distributor 212 may be a shift register, multiple ring counter or stepper switch. Its sequence is initiated by a print command from the phototube 205. Its task is to connect four of the paper tape punches sequentially to the digit translators. The digit distributor steps to the next translator each time the paper tape 219 is advanced one station. A typical punch paper tape output from a Termatrex information or data search is a long series of four-station addresses punched in binary form. A fifth channel locator hole signals each address heading. This paper tape 219 can now be run off line through a tape reader and printer. This will produce a printed hard copy list of document numbers for further use. The punched paper tape may also be used as a computer input for further data processing or conversion to tab cards.

If a hole count only is required, the translators, digit distributor and paper tape punch are not used. An electronic totalizing counter 213 containing four decade scalers is connected to the output of the phototube 205. The flying spot scanner operates as before with the phototube producing an output pulse for each coincident hole which is entered into the counter. Since the counter can accept the information at a very high speed, the E–L matrix does not require a stop command and may continue at full rate. When the scan is completed, the decimal numbers on the electronic counter 213 represent the total coincident holes in that Termatrex stack.

If an address or document number display only is required, the translators 208 through 211, digit distributors 212, paper tape punch 220 and electronic counter 213 are not used. The E–L matrix operates as before with the phototube 205 stopping the scan when a coincident hole is reached. One method of visual address display utilizes numeral indicator tubes known as Nixie tubes. Four display tubes 214, 215, 216 and 217 are required, one for each decimal digit in a Termatrex address. These display tubes are connected to the X and Y beam switching tubes and stepper switches similarly to the digit translators described earlier. The energized targets and stepper arms appropriately light a decimal numeral in each of the display tubes. This display is presented to an operator who may manually record or photograph the address numerals. When this is completed, the operator resets the pulse gate which removes the stop command and permits the flying spot on the E–L matrix to continue to the next coincident hole.

While only certain embodiment and modifications of the invention have been discussed, the invention comprises all embodiments and modifications contained within the scope of the claims.

What is claimed is:

1. Information storage and retrieval apparatus for use with storage records of the superposable peek-a-boo matrix type, each record being constituted by an essentially flat, planar and opaque physical element bearing within a predetermined area thereof an array of light-transmitting spots all positioned at intersections of selected column and row positions which constitute the matrix, said apparatus comprising:
    (a) a supporting frame,
    (b) light projecting means mounted at one end of said frame for projecting light toward the opposite end of said frame,
    (c) means carried by said frame for removably supporting at least one such record adjacent said light projecting means and in the path of light projected thereby,
    (d) a camera assembly mounted at the opposite end of said frame for receiving an image of the light-transmitting spots illuminated by said light projecting means,
    (e) means for guiding and positioning at least one photographic film strip at an image plane in said camera assembly for exposure to the received image, and
    (f) a photocell in said camera assembly positioned behind said image plane, to register the transmission of light from said source through said film strip.

2. Apparatus in accordance with claim 1, in which said light projecting means comprises a lightbox.

3. Apparatus in accordance with claim 1, in which said light projecting means comprises a multiplicity of selectively-energizable spot sources of light arranged in geometrical correspondence to the positions of the matrix.

4. Apparatus in accordance with claim 3, in which said light projecting means comprises an electroluminescent matrix.

5. Apparatus in accordance with claim 3, in which said light projecting means comprises a cathode ray tube.

6. Apparatus in accordance with claim 3, including data-storage control means for selectively energizing said spot sources.

7. Apparatus in accordance with claim 3, including means for sequentially energizing said spot sources in a predetermined order.

8. Apparatus in accordance with claim 7, including means controlled by said photocell for momentarily interrupting the sequential energization of said spot sources following the energization of a particular spot source coinciding with the position of a light transmitting spot on a record supported adjacent said light projecting means.

9. Apparatus in accordance with claim 8, including means controlled by said photocell for manifesting the coordinate positions of said particular spot.

10. Information storage and retrieval apparatus for use with storage records of the superposable peek-a-boo matrix type, each record being constituted by an essentially flat, planar and opaque physical element bearing within a predetermined area thereof an array of light-transmitting spots all positioned at intersections of selected column and row positions which constitute the matrix, said apparatus comprising:
    (a) a supporting frame,
    (b) light projecting means mounted at one end of said frame for projecting light toward the opposite end of said frame, said light projecting means comprising a multiplicity of selectively-energizable spot sources of light arranged in geometrical correspondence to the positions of the matrix,
    (c) a camera assembly mounted at the opposite end of said frame for receiving an image of the said spot sources of light, and
    (d) means for guiding and positioning at least one photographic film strip at an image plane in said camera assembly for exposure to the received image.

11. Apparatus in accordance with claim 10, including a photocell in said camera assembly positioned behind said image plane, to register the transmission of light from said source through said film strip.

References Cited by the Examiner

UNITED STATES PATENTS

| | | | |
|---|---|---|---|
| 1,817,977 | 8/1931 | Favour | 88—19.5 |
| 2,320,517 | 6/1943 | Gelfand | 88—19.5 |
| 2,348,051 | 5/1944 | Blakely | 84—24 X |
| 2,475,237 | 7/1949 | Gordon | 315—320 |
| 2,504,619 | 4/1950 | Arvidsson | 315—320 |
| 2,808,768 | 10/1957 | Squassoni | 95—4.5 |
| 2,830,285 | 4/1958 | Davis et al. | 88—24 X |
| 2,947,217 | 8/1960 | McWhirter | 88—24 |
| 2,960,379 | 11/1960 | Lipscomb | 346—107 |
| 2,973,688 | 3/1961 | Bilibok | 88—24 |
| 2,976,361 | 3/1961 | Stamps | 178—7.6 |
| 2,977,846 | 4/1961 | Pettavel | 88—24 |
| 2,982,176 | 5/1961 | Kay | 88—24 |
| 3,020,805 | 2/1962 | Goddard | 88—24 X |
| 3,030,169 | 4/1962 | Lohmeyer | 346—107 |
| 3,069,493 | 12/1962 | Martel | 178—7.6 |
| 3,111,887 | 11/1963 | Alexander | 346—107 X |
| 3,122,075 | 2/1964 | Klyce et al. | 95—4.5 |

NORTON ANSHER, *Primary Examiner.*

J. H. PEDERSEN, *Examiner.*